P. HAUN.
RESILIENT TIRE.
APPLICATION FILED JUNE 28, 1915.
1,233,351.
Patented July 17, 1917.
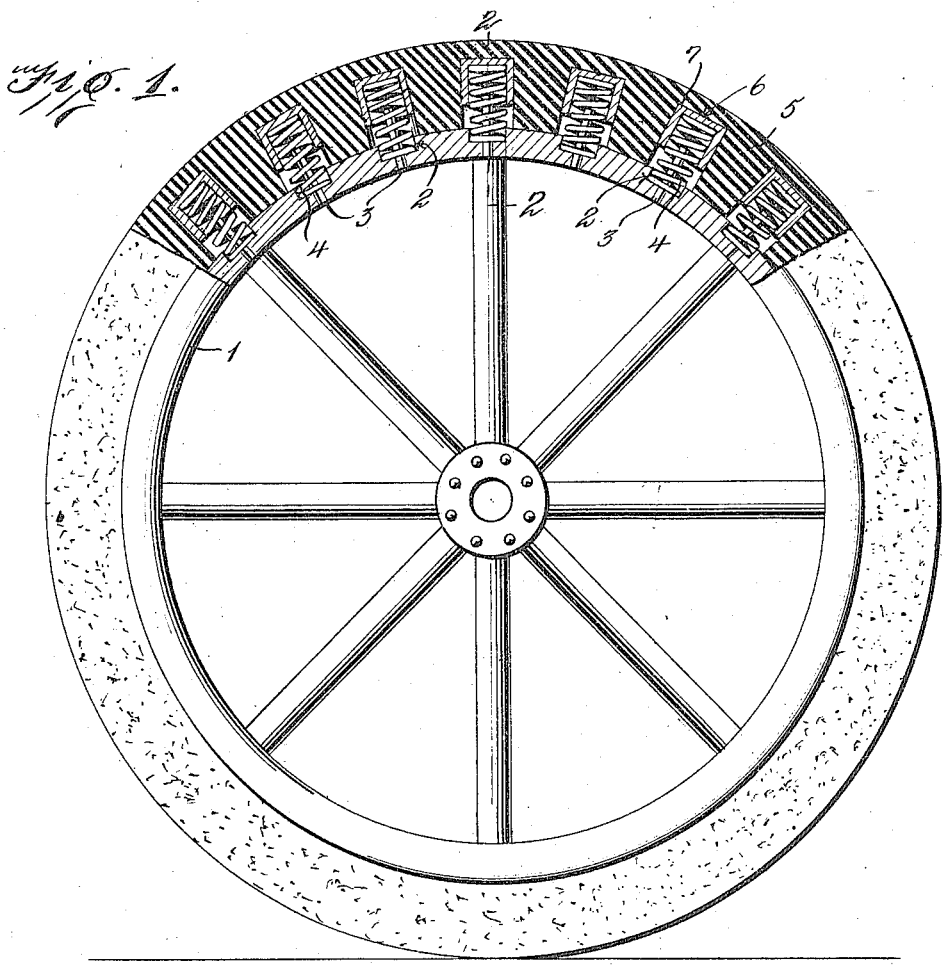
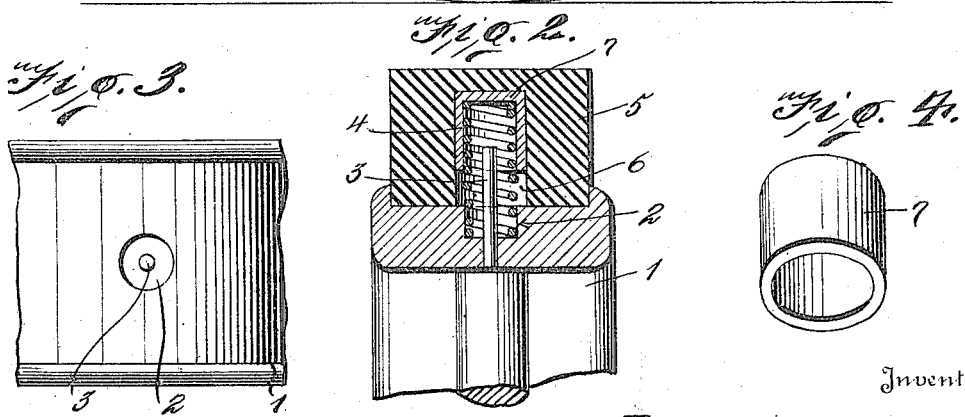
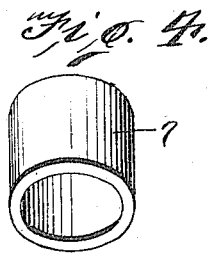
Inventor
Polaski Haun.

UNITED STATES PATENT OFFICE.

POLASKI HAUN, OF CARMEN, OKLAHOMA.

RESILIENT TIRE.

1,233,351.  Specification of Letters Patent.  Patented July 17, 1917.

Application filed June 28, 1915. Serial No. 36,811.

*To all whom it may concern:*

Be it known that I, POLASKI HAUN, a citizen of the United States of America, residing at Carmen, in the county of Alfalfa and State of Oklahoma, have invented certain new and useful Improvements in a Resilient Tire, of which the following is a specification, reference being had therein to the accompanying drawing.

This invention relates to spring tires and has for its object the production of a simple and efficient means for yieldably supporting the tire without the necessity of employing the usual pneumatic means.

Another object of this invention is the production of a simple and efficient means for mounting springs within a tire so as to yieldably support the same.

With these and other objects in view this invention consists of certain novel combinations, constructions and arrangements of parts as will be hereinafter fully described and claimed.

In the drawings:—

Figure 1 is a side elevation of the wheel, showing a portion thereof in section.

Fig. 2 is a section taken on line 2—2, of Fig. 1.

Fig. 3 is a top plan view of the rim adapted to support the tire.

Fig. 4 is a perspective of one of the spring receiving caps.

By referring to the drawings it will be seen that the numeral 1 designates the rim which may be formed of any suitable or desired construction such as for instance, a detachable or demountable rim without departing from the spirit of the invention. This rim is provided with a plurality of pockets 2 formed in the outer face thereof and spring retaining pins 3 are mounted in and spring retaining pins 3 are mounted in these pockets 2 and are adapted to support or retain the compression springs 4 in proper position upon the rim 1 of the wheel.

A rubber or other cushioned tire 5 is mounted upon the rim 1 and is provided with a plurality of pockets 6 in the inner face thereof, which pockets are of greater diameter and are adapted to fit or register over the pockets 2 of the rim 1. A metallic cap 7 is placed within each of the pockets 6 and is adapted to constitute a receptacle for the outer end of the cushioned spring 4.

It should be understood that these caps 7 will hold the sides of the springs 4 out of engagement with the resilient or cushioned tire 5 and prevent the springs from wearing upon the inner face of the apertures or pockets 6 formed in the tire 5.

It should be further understood that these caps 7 will constitute a reinforcement for the tire and prevent the ends of the springs from working through the tread of the tire.

Having thus described the invention what is claimed as new is:—

A resilient tire comprising a resilient body provided with a plurality of circular pockets formed upon the inner face thereof, metallic caps seated within said pockets and constituting a reinforcement for the inner ends of said pockets, said pockets being uniform in diameter throughout their entire length, a rim provided with pockets formed therein of the same diameter as the interior of said caps and registering with said pockets formed in said resilient body, a guiding pin carried by each pocket in said rim and adapted to project into the pockets formed in said resilient body, coil springs, each spring having one end seated in a pocket formed in said rim and having its opposite end seated in a metallic cap mounted within a pocket formed in said resilient body, said metallic cap being adapted to hold the sides of said coil spring out of engagement with the resilient body and preventing the wearing of said spring upon said body, and said pins carried by said rim being adapted to hold said resilient body against slipping movement around the circumference of said rim.

In testimony whereof I hereunto affix my signature.

POLASKI HAUN.

Copies of this patent may be obtained for five cents each, by addressing the "Commissioner of Patents, Washington, D. C."